United States Patent
Liao

(10) Patent No.: US 6,560,913 B1
(45) Date of Patent: May 13, 2003

(54) DEVICE FOR HOOKING, MEASURING, WEIGHING FISH

(76) Inventor: Eric Liao, No. 108-24, Chong Chin Road, Bei Tun Chu, Taichung (TW), 406

( * ) Notice: Subject to any disclaimer, the term of this patent is extended or adjusted under 35 U.S.C. 154(b) by 0 days.

(21) Appl. No.: 10/151,212

(22) Filed: May 16, 2002

(51) Int. Cl.⁷ .............................................. A01K 97/00
(52) U.S. Cl. .................... 43/5; 43/4; 43/53.5; 294/115; 294/110.1; 177/232; 177/245
(58) Field of Search ................. 43/53.5, 4, 5; 294/19.3, 294/115, 110.1; 177/148, 225, 232, 233, 245

(56) References Cited

U.S. PATENT DOCUMENTS

| | | | | |
|---|---|---|---|---|
| 268,153 A | * | 11/1882 | Turner .......................... | 294/115 |
| 327,575 A | * | 10/1885 | Mitchell ...................... | 294/115 |
| 452,278 A | * | 5/1891 | McIlvaine ..................... | 43/5 |
| 479,718 A | * | 7/1892 | Morgan et al. .............. | 177/232 |
| 952,552 A | * | 3/1910 | Weldon ........................ | 177/232 |
| 1,206,733 A | * | 11/1916 | Sirard .......................... | 294/19.3 |
| 1,220,899 A | * | 3/1917 | Sorensen ..................... | 294/115 |
| 2,358,632 A | * | 9/1944 | Gerken ......................... | 294/115 |
| 2,588,733 A | * | 3/1952 | Knox ........................... | 294/110.1 |
| 2,603,474 A | * | 7/1952 | Mandolf et al. ............. | 177/245 |
| 2,690,927 A | * | 10/1954 | Bean ............................ | 177/245 |
| 2,750,184 A | * | 6/1956 | Warndahl ..................... | 177/245 |
| 2,994,622 A | * | 8/1961 | Miller .......................... | 177/245 |
| 3,094,349 A | * | 6/1963 | Schwalm ...................... | 294/115 |
| 3,288,513 A | * | 11/1966 | Behrick ....................... | 294/19.3 |
| 3,848,689 A | * | 11/1974 | Hilterhaus ................... | 177/245 |
| 5,119,585 A |  | 6/1992 | Camp .......................... | 43/53.5 |
| 5,637,838 A | * | 6/1997 | Arey et al. .................. | 177/245 |
| 5,709,120 A | * | 1/1998 | Shilling ....................... | 294/115 |
| 5,922,999 A | * | 7/1999 | Yang ........................... | 177/232 |
| 5,986,222 A | * | 11/1999 | Helberg ....................... | 177/148 |
| 6,094,996 A | * | 8/2000 | Campbell et al. ........... | 177/245 |
| 6,246,017 B1 | * | 6/2001 | Yang ........................... | 177/232 |

* cited by examiner

*Primary Examiner*—Darren W. Ark

(57) ABSTRACT

A weighing device includes a tubular housing, a pair of levers pivotally secured the tubular housing and each having a jaw biased to grasp an object to be weighed and a handle for moving the jaws away from each other against a spring. The jaws are movable away from each other to grasp the object when the handles are moved toward each other, such that the handles may actuate the jaws away from each other to grasp the object. Two links have outer ends secured to the levers and inner ends secured together. The spring may bias the links to force the handles away from each other.

16 Claims, 5 Drawing Sheets

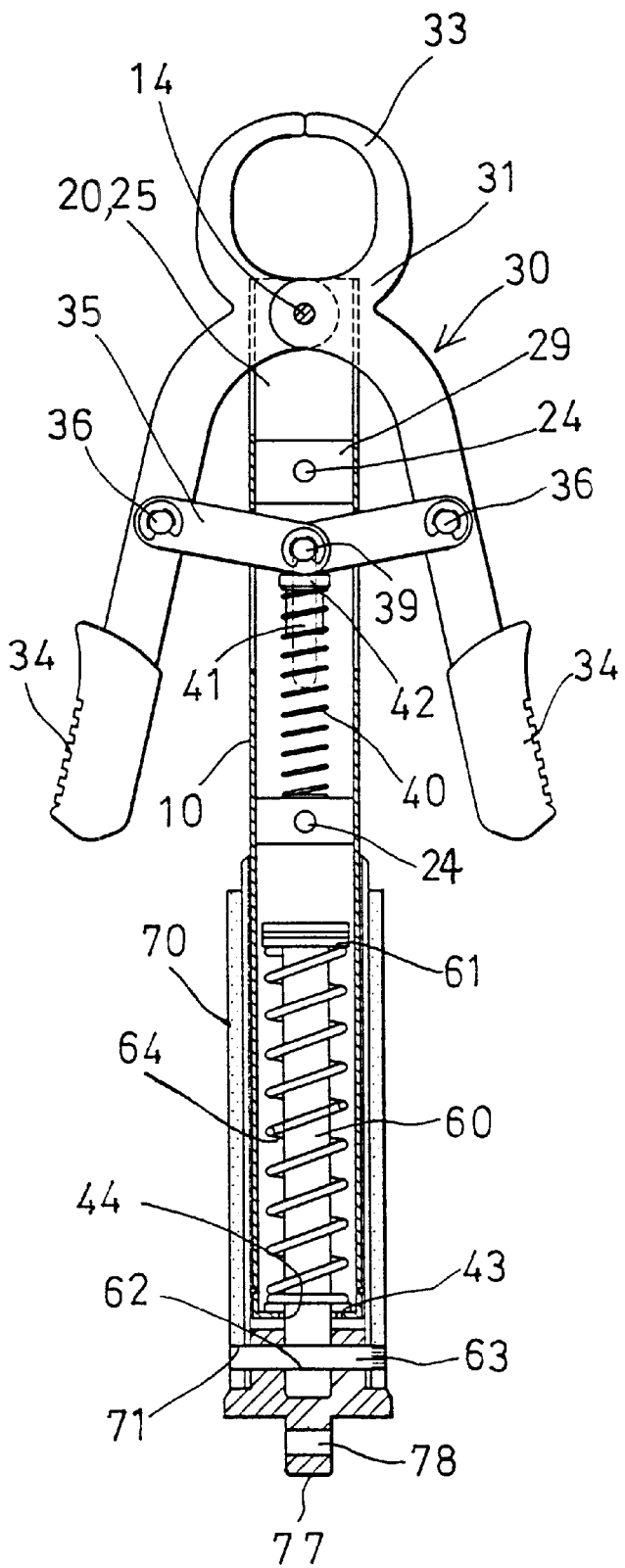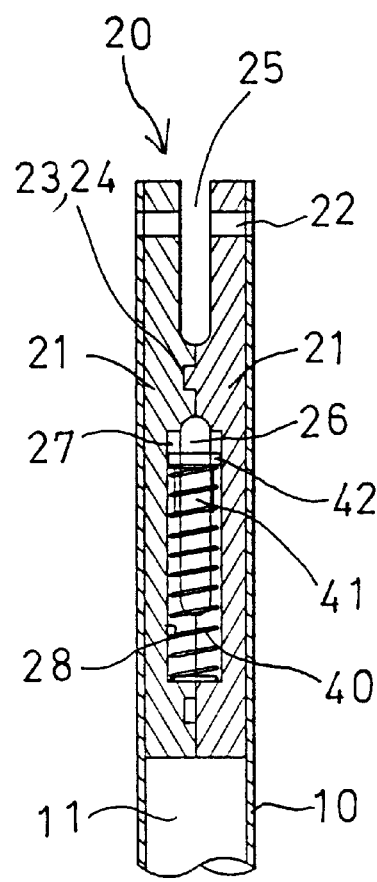
FIG. 3
FIG. 4

DEVICE FOR HOOKING, MEASURING, WEIGHING FISH

BACKGROUND OF THE INVENTION

1. Field of the Invention

The present invention relates to a weighing device, and more particularly to a weighing device including a pair of jaws having actuatable handle.

2. Description of the Prior Art

Typical weighing devices have been developed and provided for weighing fish or the like. U.S. Pat. No. 5,119,585 to Camp discloses one of the typical weighing devices including a pair of jaws pivotally secured to a tubular housing which is slidably received in a sleeve or a trigger, and a pair of jaw actuating members coupled to the jaws respectively and slidably engaged in the tubular housing. However, the sleeve may not be easily moved along the tubular housing by the user.

The present invention has arisen to mitigate and/or obviate the afore-described disadvantages of the conventional weighing devices.

SUMMARY OF THE INVENTION

The primary objective of the present invention is to provide a weighing device including a pair of jaws having actuatable handle for easily actuating the jaws to hook or to engage with the fish to be weighed.

In accordance with one aspect of the invention, there is provided a weighing device comprising a tubular housing including a first end, a second end, and a middle portion, a pair of levers including a middle portion pivotally secured to the first end of the tubular housing with a shaft, and each including a first end having a jaw provided thereon and extended outward of the tubular housing for grasping an object to be weighed, and each including a second end having a handle extended outward of the tubular housing, means for biasing the handles away from each other to force the jaws toward each other to grasp the object, and means for weighing the object. The jaws are movable away from each other to engage with and to grasp the object when the handles are moved toward each other against the biasing means, such that the handles may be used for easily operating or actuating the jaws away from each other to grasp or grip the object to be weighed.

The biasing means includes a pair of links each having an outer end pivotally secured to the levers, and each having an inner end received in the tubular housing.

The biasing means includes a spring engaged with the inner ends of the links, for biasing the links to move the handles away from each other.

A first of the links includes an opening formed therein for receiving the inner end of a second of the links, and a pivot rod engaged through the inner ends of the links. The tubular housing includes a pair of grooves formed therein for slidably receiving the pivot rod.

The tubular housing includes a pair of channels formed in the middle portion thereof, for slidably receiving the links respectively.

An insert is further provided and engaged in the first end of the tubular housing, and includes a hole formed therein for receiving the shaft, and for securing the insert in the first end of the tubular housing.

The insert includes a first and a second members, the first member includes at least one depression formed therein, the second member includes at least one stud extended therefrom and engaged into the depression of the first member for securing the first and the second members together.

The tubular housing includes a pair of slots formed in the first end thereof for slidably receiving the middle portions of the levers, the insert includes a notch formed therein and aligned with the slots of the tubular housing, for receiving the middle portions of the levers.

The insert includes a passage formed therein and aligned with the channels of the tubular housing for slidably receiving the inner ends of the links. The insert includes a chamber formed therein for receiving the spring.

The biasing means includes a follower engaged in the spring and having an enlarged head engaged.with the inner ends of the links.

The weighing means includes a graduation provide d on the tubular housing, a barrel slidably engaged on the second end of the tubular housing, a post received in the barrel and having a first end secured to the barrel and having a second .end, and a spring engaged between the second end of the spring and engaged with the tubular housing for biasing the second end of the post toward the first end of the tubular housing .

Further objectives and a advantages of the present invention will become apparent from a careful reading of a detailed description provided hereinbelow, with appropriate reference to accompanying drawings.

BRIEF DESCRIPTION OF THE DRAWINGS

FIG. 3 is a cross sectional view taken along lines 3—3 of FIG. 1;

FIG. 4 is a partial cross sectional view of the weighing device; and

DETAILED DESCRIPTION OF THE PREFERRED EMBODIMENT

Figure 1:
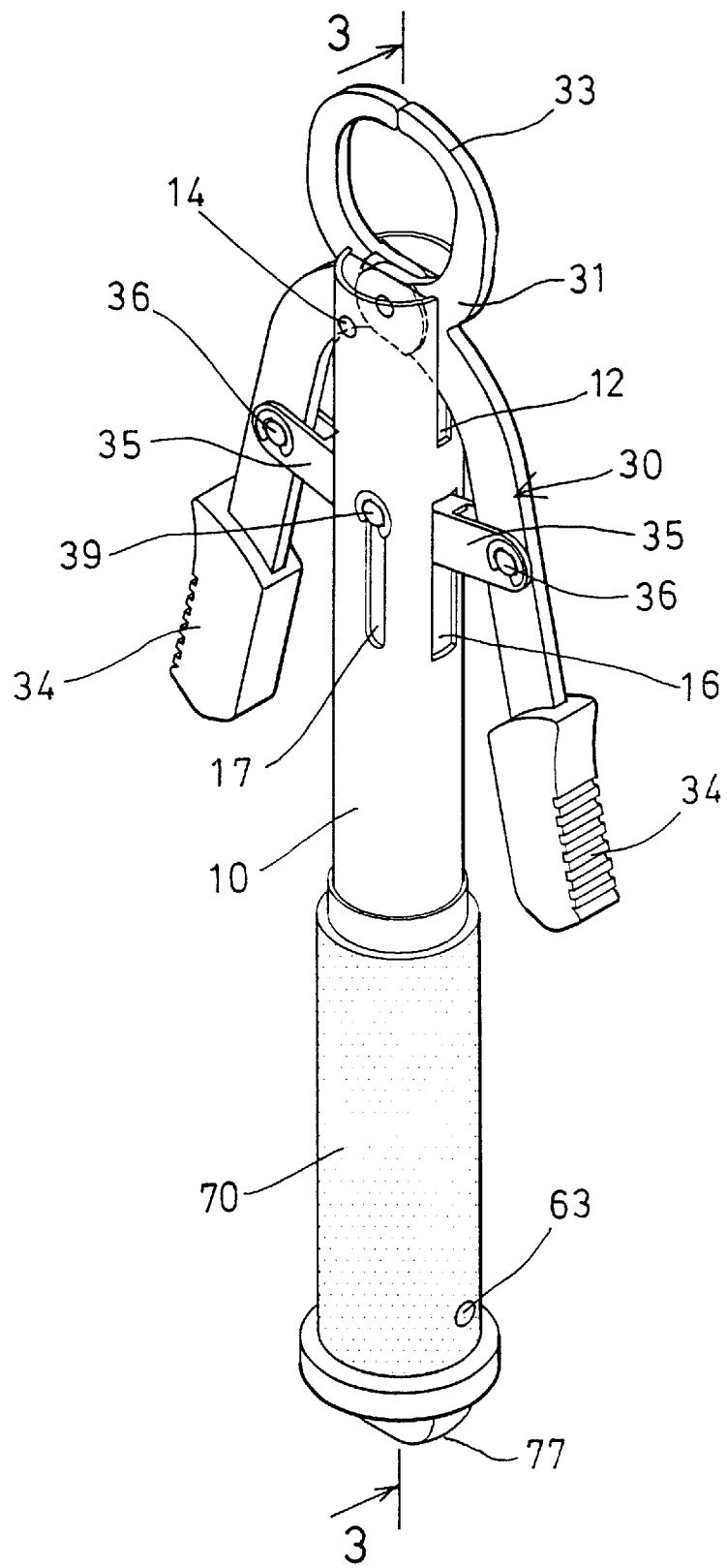
FIG. 1 is a perspective view of a weighing device in accordance with the present invention.
Figure 2:
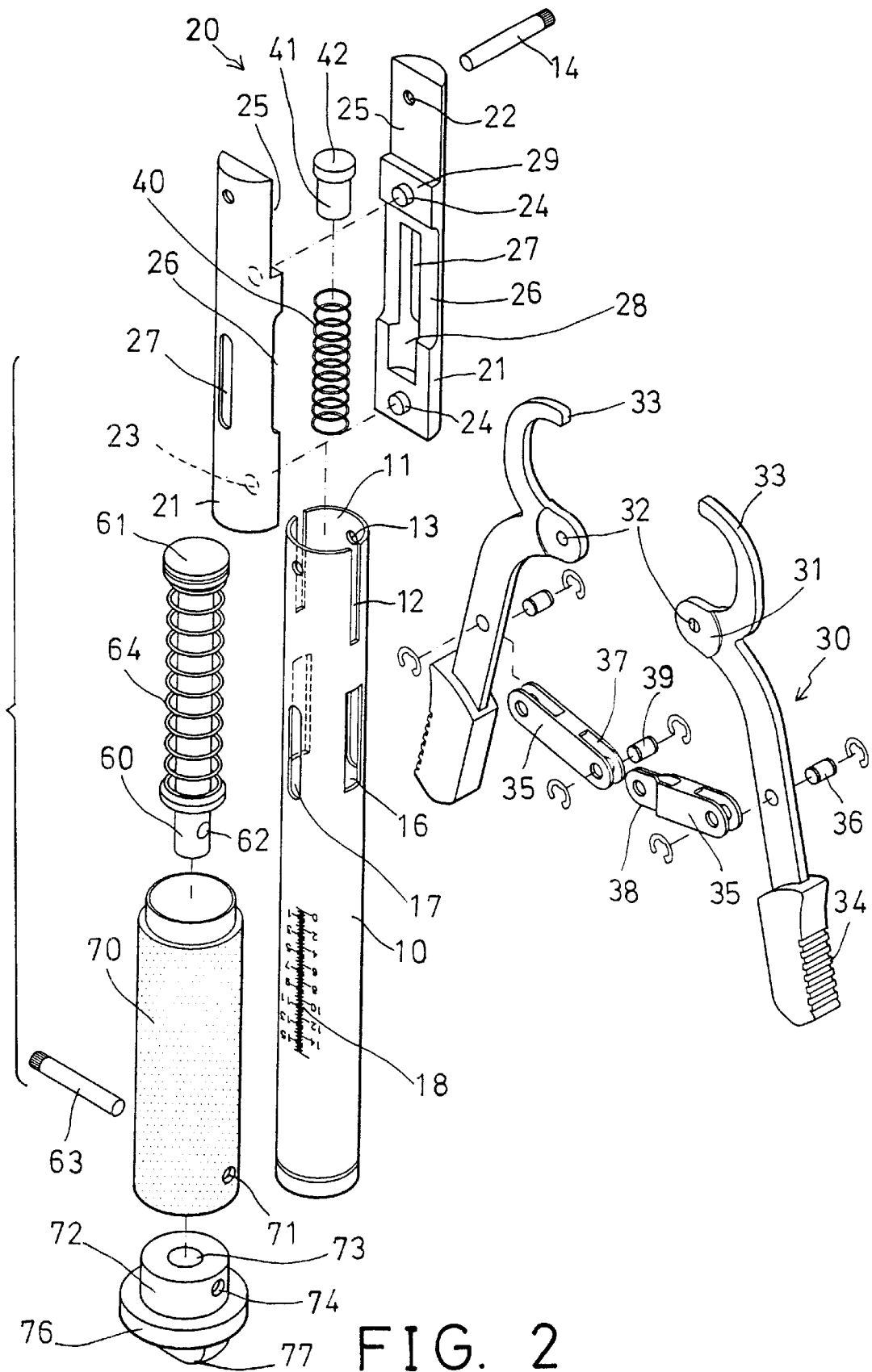
FIG. 2 is an exploded view of the weighing device.

Referring to the drawings, and initially to FIGS. 1–3, a weighing device in accordance with the present invention comprises a tubular housing 10 including a bore 11 formed therein, and including a pair of slots 12 and a pair of orifices 13 oppositely formed in one end thereof, and including a pair of opposite channels 16 and a pair of opposite grooves 17 formed in the middle portion thereof. A shaft 14 is engaged through the orifices 13 of the tubular housing 10. The tubular housing 10 includes a graduation 18 formed or provided thereon.

An insert 20 is engaged in the one end of the tubular housing 10, and preferably solidly or snugly received in the tubular housing 10 for reinforcing the tubular housing 10, and includes a hole 22 formed in one end thereof for receiving the shaft 14, and for allowing the insert 20 to be solidly secured and retained in the one end of the tubular housing 10. The insert 20 includes such as two half members 21. One of the half members 21 includes one or more depressions 23 formed therein, and the other half member 21 includes one or more studs 24 extended therefrom and engaged into the depressions 23 of the one half member 21, and for securing the half members 21 together.

The insert 20 includes a notch 25 formed in one end thereof, such as formed in one end of each of the half members 21, and a passage 26 formed in the middle portion thereof, such as formed in the middle portion of each of the half members 21, for forming or defining a bulge 29 between the notch 25 and the passage 26 of the half members 21 respectively. The insert 20 further includes a passageway 27 formed in the middle portion thereof, such as formed in the middle portion of each of the half members 21, and includes a chamber 28 formed therein and communicating with the passages 26 and the passageways 27 thereof.

A pair of levers 30 each includes a middle portion 31 received in the notch 25 of the insert 20 and in the slots 12 of the tubular housing 10, and each includes an aperture 32 formed in the middle portion 31 thereof for receiving the shaft 14, and for allowing the middle portions 31 of the levers 30 to be pivotally or rotatably secured to the tubular housing 10 with the shaft 14. The levers 30 each includes a jaw 33 formed or provided on one end thereof for engaging with or hooking to the object 80, such as the fish, and each includes a handle 34 provided on the other end thereof for moving the jaws 33 toward or away from each other.

The passages 26 and the passageways 27 of the insert 20 are aligned with or communicating with the channels 16 and the grooves 17 of the tubular housing 10 respectively. A pair of links 35 are slidably received in the passages 26 of the insert 20 and the channels 16 of the tubular housing 10 respectively, and include one end or outer end extended outward of the tubular housing 10 and pivotally or rotatably secured to the levers 30 with a pivot pin 36 respectively, and the other end or inner end received in the tubular housing 10 and in the chamber 28 of the insert 20.

For example, one of the links 35 includes an opening 37 formed therein, such as formed in the inner end thereof for receiving the other or inner end 38 of the other link 35. A pivot rod 39 is engaged through the other or inner ends 38 of the links 35 and slidably engaged in the passageways 27 of the insert 20 and/or the grooves 17 of the tubular housing 10 respectively. A spring 40 and a follower 41 are received in the chamber 28 of the insert 20, in which the follower 41 is received in one end of the spring 40 and includes an enlarged head 42 biased to engage with the inner ends 38 of the links 35.

Figure 5:
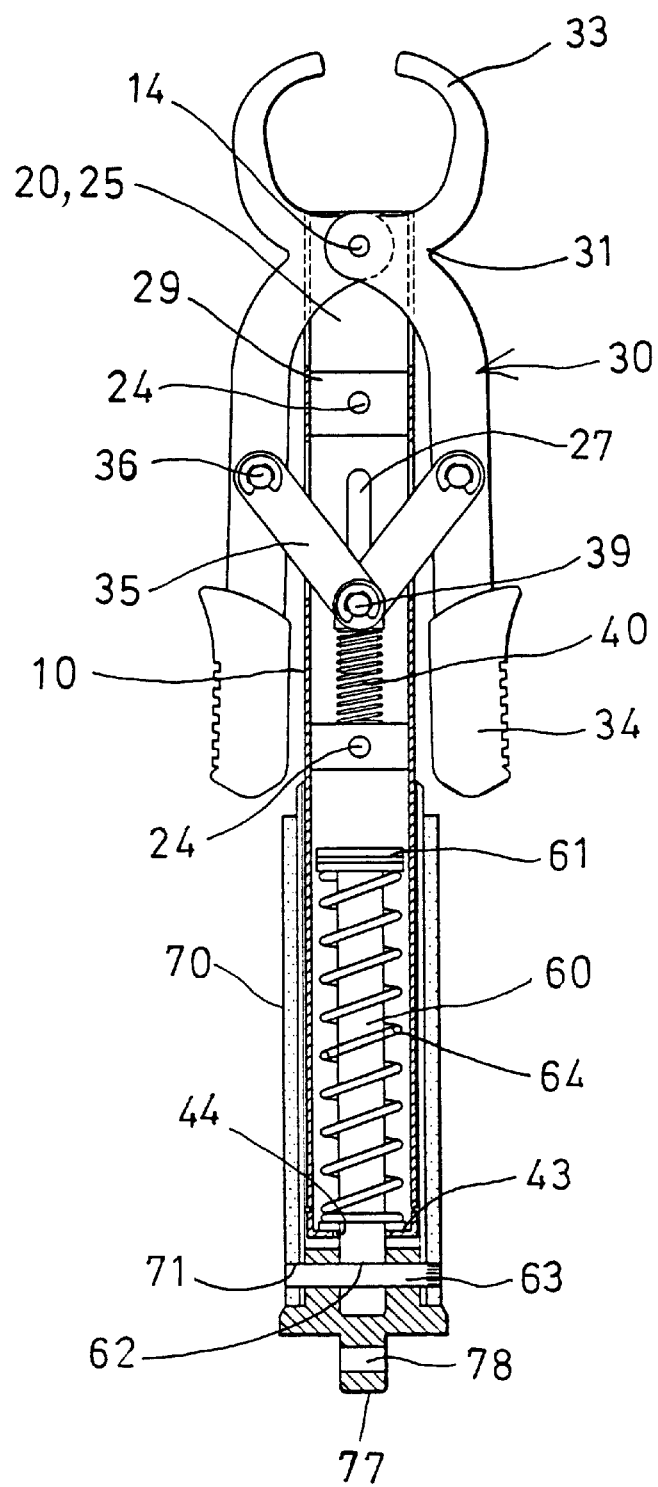
FIG. 5 is a cross sectional view similar to FIG. 3, illustrating the operation of the weighing device.
Figure 6:
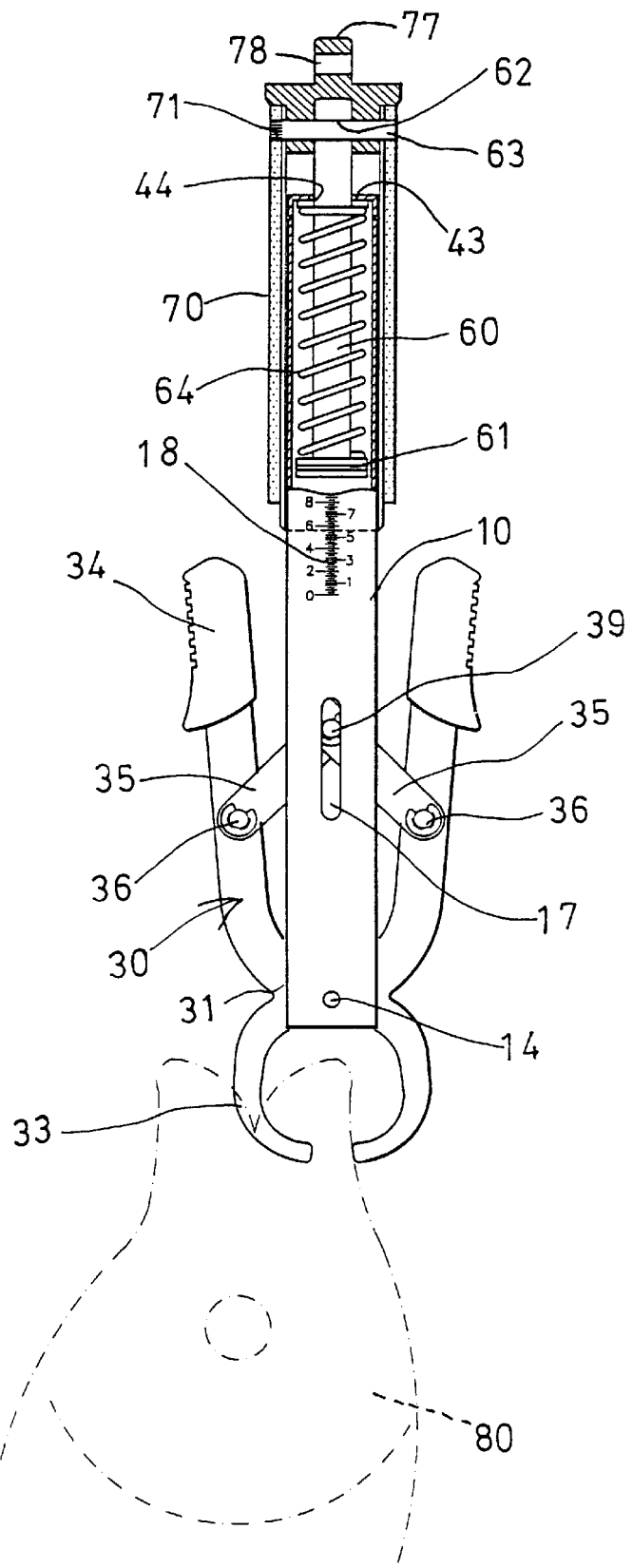
FIG. 6 is a partial cross sectional view illustrating the operation of the weighing device.

In operation, as shown in FIGS. 3 and 5, the spring 40 may directly force or bias the inner ends 38 of the links 35 toward the jaws 33, or indirectly via the follower 41, in order to bias the handles 34 of the levers 30 away from each other (FIG. 3), and so as to bias the jaws 33 toward each other to grip or grasp the object 80 (FIG. 6). The handles 34 may be forced toward each other, and the inner ends 38 of the links 35 may be forced against the spring 40, in order to open the jaws 33, and for allowing the jaws 33 to engaged onto or into the object 80. The jaws 33 may be biased to grip or to grasp the object 80 by the spring 40 when the handles 34 are released. The spring 40 and the links 35 may thus form a biasing means or device for biasing the handles away from each other and for forcing the jaws 33 toward each other to grasp the object 80 to be weighed.

As shown in FIGS. 3, 5, 6, the tubular housing 10 includes a peripheral flange 43 extended radially inward the bore 11 thereof, for forming or defining an aperture 44 therein. A post 60 is slidably engaged through the aperture 44 of the tubular housing 10, and includes an enlarged head 61 formed or provided on one end thereof and slidably received in the bore 11 of the tubular housing. 10, and includes a hole 62 formed in the other end thereof for receiving a pole 63. A spring 64 is engaged on the post 60 and biased between the head 61 and the peripheral flange 43 of the tubular housing 10, for biasing the head 61 away from the pole 63.

A barrel 70 is slidably engaged onto the other end of the tubular housing 10, and includes an orifice 71 formed in one end thereof for receiving the pole 63, such that the post 60 may be pulled or moved relative to the tubular housing 10 against the spring 64. A cap 72 is engaged into the barrel 70, and includes a bore 73 formed therein for receiving the post 60, and includes a hole 74 laterally formed therein and communicating with the bore 73 thereof for receiving the pole 63, such that the cap 72 may be secured to the barrel 70 and the post 60. The cap 72 includes a peripheral rib 76 extended radially outward therefrom for engaging with the barrel 70, and for solidly securing the cap 72 to the barrel 70. The cap 72 further includes a swelling 77 having a hole 78 formed therein for hanging or hooking purposes.

In operation, as shown in FIG. 6, when the jaws 33 are engaged with or hooked to or grasped the object 80, the object 80 and the tubular housing 10 may be moved or forced downward against the spring 64 due to the weight of the object 80 and/or the tubular housing 10. The barrel 70 may thus be moved relative to the graduation 18 of the tubular housing 10, such that the weight of the object 80 may be read by the alignment of the other end of the barrel 70 with the graduation 18 of the tubular housing 10.

The barrel 70 and/or the post 60 and the spring 64 may thus form a weighing means or device for the tubular housing 10, and for weighing the object 80. The barrel 70 and the spring 64 may be adjusted or calibrated to zero before the object 80 is grasped by the jaws 33. The jaws 33 may be easily and quickly moved away from each other to engage with or to grasp the object 80 by moving the handles 34 toward each other against the spring 40.

Accordingly, the weighing device in accordance with the present invention includes a pair of jaws having actuatable handle for easily actuating the jaws to hook or to engage with the fish to be weighed.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A weighing device comprising:

a tubular housing including a first end, a second end, and a middle portion;

a pair of levers including middle portions pivotally secured to said first end of said tubular housing with a shaft, and each including a first end having a jaw provided thereon and extended outward of said tubular housing for grasping an object to be weighed, and each including a second end having a handle extended outward of said tubular housing;

means for biasing said handles away from each other to force said jaws toward each other to grasp the object; and means for weighing the object, said weighing means including a graduation provided on said tubular housing, a barrel slidably engaged on said second end of said tubular housing, a post received on said barrel and having a first end secured to said barrel and having a second end, and a spring engaged between said second end of said post and engaged with said tubular housing for biasing said second end of said post toward said first end of said tubular housing;

said jaws being movable away from each other to engage with and to grasp the object when said handles are moved toward each other against said biasing means.

2. The weighing device according to claim 1, wherein said biasing means includes a first link and a second link each having an outer end pivotally secured to said levers, and each having an inner end received in said tubular housing.

3. The weighing device according to claim 2, wherein said biasing means includes a spring engaged with said inner ends of said links, for biasing said links to move said handles away from each other.

4. The weighing device according to claim 2, wherein said first link includes an opening formed therein for receiving said inner end of said second link, and a pivot rod engaged through said inner ends of said links.

5. The weighing device according to claim 4, wherein said tubular housing includes a pair of grooves formed therein for slidably receiving said pivot rod.

6. The weighing device according to claim 2, wherein said tubular housing includes a pair of channels formed in said middle portion thereof, for slidably receiving said links respectively.

7. The weighing device according to claim 1 further comprising an insert engaged in said first end of said tubular housing, and including a hole formed therein for receiving said shaft, and for securing said insert in said first end of said tubular housing.

8. The weighing device according to claim 7, wherein said insert includes a first and a second member, said first member includes at least one depression formed therein, said second member includes at least one stud extended therefrom and engaged into said at least one depression of said first member for securing said first and said second members together.

9. The weighing device according to claim 7, wherein said tubular housing includes a pair of slots formed in said first end thereof for slidably receiving said middle portions of said levers, said insert includes a notch formed therein and aligned with said slots of said tubular housing, for receiving said middle portions of said levers.

10. The weighing device according to claim 7, wherein said tubular housing includes a pair of channels formed therein, said insert includes a passage formed therein and aligned with said channels of said tubular housing.

11. The weighing device according to claim 10, wherein said biasing means includes a pair of links each having an outer end pivotally secured to said levers, and each having an inner end slidably received in said channels of said tubular housing and said passage of said insert.

12. The weighing device according to claim 11, wherein said biasing means includes a spring engaged with said inner ends of said links, for biasing said links to move said handles away from each other.

13. The weighing device according to claim 12, wherein said insert includes a chamber formed therein for receiving said spring.

14. The weighing device according to claim 12, wherein said biasing means includes a follower engaged in said spring and having an enlarged head engaged with said inner ends of said links.

15. The weighing device according to claim 11, wherein a first one of said pair of links includes an opening formed therein for receiving said inner end of a second one of said pair of links, and a pivot rod engaged through said inner ends of said pair of links.

16. The weighing device according to claim 15, wherein said tubular housing includes a pair of grooves formed therein for slidably receiving said pivot rod.

* * * * *